US012714127B1

(12) United States Patent
Kramer et al.

(10) Patent No.: US 12,714,127 B1
(45) **Date of Patent: *Aug. 25, 2026**

(54) METHOD OF PRODUCING DECOLORIZED BEET PRODUCTS AND COMPOSITIONS PRODUCED THEREFROM

(71) Applicant: ThermoLife International, LLC, Phoenix, AZ (US)

(72) Inventors: Ronald Kramer, Signal Hill, CA (US); Alexandros Nikolaidis, Nea Kallikratia (GR)

(73) Assignee: ThermoLife International, LLC, Signal Hill, CA (US)

( * ) Notice: Subject to any disclaimer, the term of this patent is extended or adjusted under 35 U.S.C. 154(b) by 928 days.

This patent is subject to a terminal disclaimer.

(21) Appl. No.: 17/401,214

(22) Filed: Aug. 12, 2021

Related U.S. Application Data

(63) Continuation-in-part of application No. 16/678,506, filed on Nov. 8, 2019.

(60) Provisional application No. 62/757,642, filed on Nov. 8, 2018.

(51) Int. Cl.

| | |
|---|---|
| ***A23L 2/72*** | (2006.01) |
| ***A23L 2/02*** | (2006.01) |
| ***A23L 5/20*** | (2016.01) |
| ***A23L 19/10*** | (2016.01) |

(52) U.S. Cl.
CPC *A23L 2/72* (2013.01); *A23L 2/02* (2013.01); *A23L 5/273* (2016.08); *A23L 19/10* (2016.08)

(58) Field of Classification Search
CPC ............... A23L 2/02; A23L 2/72; A23L 5/273
See application file for complete search history.

(56) References Cited

U.S. PATENT DOCUMENTS 2,221,683 A * 11/1940 Smit ........................ C02F 1/283 502/425
2,388,222 A * 10/1945 Sidney .................... C13B 20/14 521/37
4,264,373 A * 4/1981 Shinbori ............... C13B 20/123 127/55
5,411,755 A 5/1995 Downton et al.
5,972,121 A * 10/1999 L'Hermine ............. C13B 20/12 127/55
2006/0090749 A1* 5/2006 Rein ....................... C13B 20/08 127/46.1
2008/0299287 A1* 12/2008 Carter ..................... C13B 20/18 426/660

(Continued)

FOREIGN PATENT DOCUMENTS

| | | |
|---|---|---|
| CN | 105661199 A | 6/2016 |
| CN | 105685739 A | 6/2016 |
| WO | 2013082018 A1 | 6/2016 |

OTHER PUBLICATIONS

Office Action (Final Rejection) dated May 23, 2022 for U.S. Appl. No. 16/678,506 (pp. 1-20).

(Continued)

*Primary Examiner* — Stephanie A Kohler
(74) *Attorney, Agent, or Firm* — Pacer K. Udall; Booth Udall, PLC

(57) ABSTRACT

The present invention provides methods of producing decolorized beet products and compositions produced therefrom. In some implementations, the decolorized beet product is decolorized beetroot juice.

18 Claims, 9 Drawing Sheets
(9 of 9 Drawing Sheet(s) Filed in Color)

(56) References Cited

U.S. PATENT DOCUMENTS

| | | | | |
|---|---|---|---|---|
| 2010/0047344 | A1* | 2/2010 | Lundberg | A61P 9/00<br>424/48 |
| 2015/0101594 | A1* | 4/2015 | Verma | C13B 20/06<br>127/50 |
| 2016/0303177 | A1* | 10/2016 | Bailey | A61K 31/122 |
| 2016/0353782 | A1 | 12/2016 | Ruppman | |
| 2018/0035705 | A1 | 2/2018 | Alter | |
| 2018/0133247 | A1 | 5/2018 | Green | |

OTHER PUBLICATIONS

Wruss et al. ("Compositional characteristics of commercial beetroot products and beetroot juice prepared from seven beetroot varieties grown in Upper Austria", Journal of Rood Composition and Analysis 42(2015) 46-55; Retrieved from Internet URL: http:// dx.doi.org/10.1016/j.jfca.2015.03.005). (Year: 2015).

Iqbal, Muhammad J. et al., "Adsorption of dyes from aqueous solutions on activated charcoal", Journal of Hazardous Materials, B39, 2007, pp. 57-66. (Year: 2007).

* cited by examiner

FIG. 9
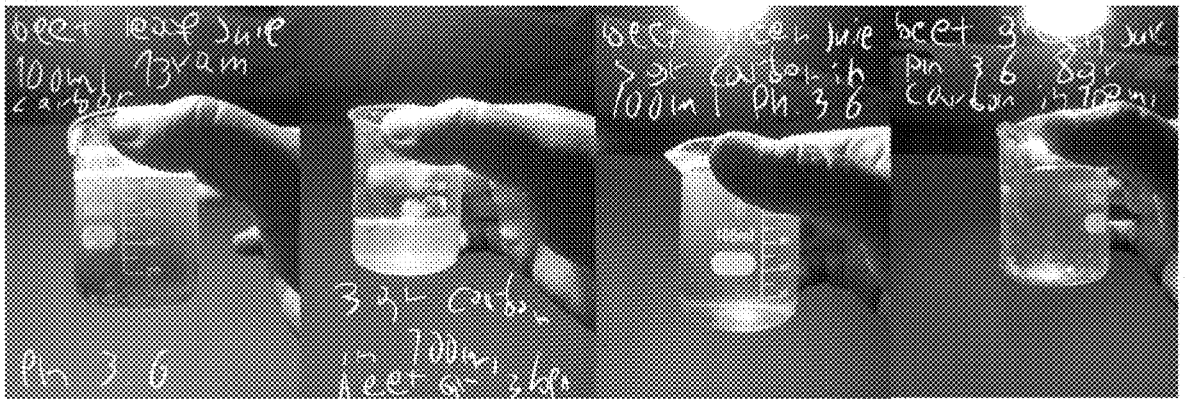
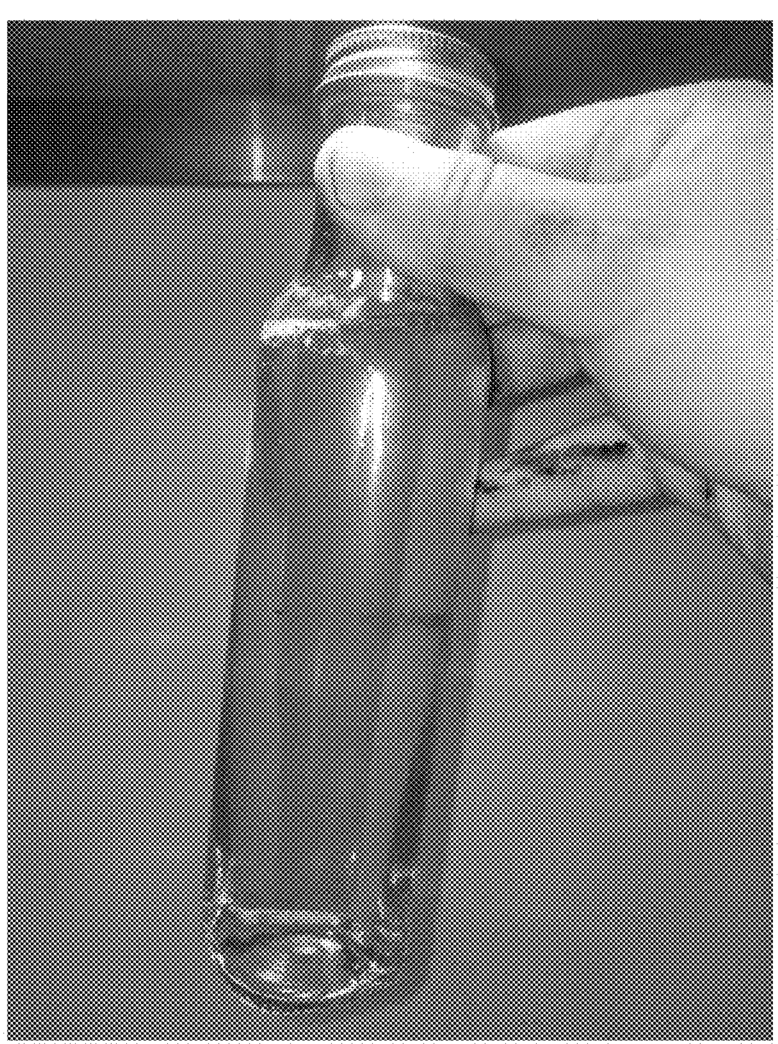
FIG. 10

METHOD OF PRODUCING DECOLORIZED BEET PRODUCTS AND COMPOSITIONS PRODUCED THEREFROM

CROSS REFERENCE TO RELATED APPLICATIONS

This application is a continuation-in-part application of U.S. patent application Ser. No. 16/678,506, filed Nov. 8, 2019, which claims the benefit of and priority to U.S. provisional patent application 62/757,642, filed Nov. 8, 2018, the entirety of the disclosures of which are hereby incorporated by this reference.

BACKGROUND

Beetroot is the taproot portion of the beet plant, usually known in North America as beet, table beet, garden beet, or red or golden beet. It is several of the cultivated varieties of *Beta vulgaris* grown for their edible taproots and their leaves (called beet greens). These varieties have been classified as *B. vulgaris, Conditiva* group.

Beetroot has a high nutritive value, as they are an excellent source of folate and a very good source of manganese, potassium, and copper. They are also a good source of dietary fiber, magnesium, phosphorus, vitamin C, iron, and vitamin B6. Furthermore, beets have lately gained attention as a natural source of dietary nitrate. In particular, dietary nitrate has gained interest as an agent for increasing athletic performance, reducing blood pressure, and supporting cardiovascular health.

Unfortunately, consumption of beetroot for its nutritional benefits can lead to stress, concern, and unneeded doctor visits. Eating beetroots or foods colored with beetroot extract or beetroot pigments beetroot leads passing of red or pink urine, a condition called beeturia. The color is caused by the excretion of betalain (betacyanin) pigments such as betanin. The coloring is highly variable between individuals and between different occasions and can vary in intensity from invisible to strong. Although beeturia by itself is not dangerous of harmful, it can be easily mistaken for hematuria or bloody stools. Beeturia can also mask symptoms of kidney or liver failure, urinary tract infection, or other conditions where the symptoms include dark red or brown urine. Rhabdomyolysis is a serious condition where the kidney is damaged by myoglobin released from the breakdown of muscle tissue, and its symptoms include dark, reddish urine. Thus, for populations consuming beetroot-based products as a fitness supplement, beeturia can mask evidence of overly working out.

The bright red color of the juice also causes other problems, such as easy staining of clothes and other artifacts and unwanted coloring of solutions/powders. Accordingly, there is a need for a way of getting the nutritional benefits of beetroot without the problems caused by betalain pigments.

SUMMARY

The invention relates to methods of decolorizing a beet (*B. vulgaris, Conditiva* group) product and the resulting processed beet product. The method described herein removes red color from a beet product. Thus in some embodiments, the invention is directed to compositions of decolorized or partially decolorized beet products. In some aspects, the composition comprises a colorless beet product, which does not cause beeturia. In some implementations, the decolorized beet composition is in a liquid form. For example, the liquid decolorized beet composition comprises a beet product selected from the group consisting of: beetroot juice, beetroot extract, beetroot tincture, and beetroot jam. In certain embodiments, the composition comprises clear and colorless beet juice. In other implementations, the decolorized beet composition is in a solid form. For example, the solid decolorized beet composition comprises a beet product selected from the group consisting of: beetroot powder, powdered beetroot extract, and beetroot juice powder.

In some aspects, the composition described herein is produced by a method comprising providing a beet liquid; providing a sufficient amount of activated carbon; combining the activated carbon and the beet liquid to produce a processed beet product; and collecting the processed beet product. In certain implementations, the method further comprises acidifying the beet liquid prior to the step of combining the activated carbon and the beet liquid. In some aspects, the step of collecting the processed beet product comprises separating the activated carbon from the processed beet product. In certain embodiments, the beet liquid is beet juice, beetroot juice, or beetroot powder mixed with water, ethanol, or some other solvent that is suitable for human consumption or can be easily removed.

In some implementations, the beet liquid is acidified to a pH of less than 6.5, such as between 3.3 and 4.4 or 3.6, prior to being combined with activated carbon. In some implementations, the sufficient amount of activated carbon is at least 3 grams of activated carbon per 100 ml of beet liquid, at least 5 grams of activated carbon per 100 ml of beet liquid, at least 8 grams of activated carbon per 100 ml beet liquid, or 10 grams of activated carbon per 100 ml of beet liquid. In some aspects, the mixture of activated carbon and the acidified beet juice is stirred, for example for one hour. In certain implementations the mixture of activated carbon and the acidified beet juice is stirred at a speed of 300 rpm.

In certain embodiments, the method further comprises resting the beet product combined with the activated carbon prior to collecting the processed beet product. For example, the beet product combined with the activated carbon is rested for at least 1 minute, rested for 1 hour, rested for at least 1 hour, or rested for 12 hours.

To produce a solid beet product that does not cause beeturia, the step of evaporating the decolorized beet liquid follows the method of removing red color from a beet product. In certain implementations, water, ethanol, or some other solvent that is suitable for human consumption or that can be easily removed are evaporated from the decolorized beet liquid.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 2A shows the original color of beetroot juice (acidified or non-acidified), while

from the processed beetroot juice. The top row of beakers contain beetroot juice acidified to a pH of about 3.6 using citric acid, and the bottom row of beakers contain beet juice without acidification (pH of 6.2). The amount of activated carbon used to process the beetroot juice in each beaker is (from left to right) 1 gram, 3 grams, 5 grams, 8 grams, and 10 grams.

Figure 3:
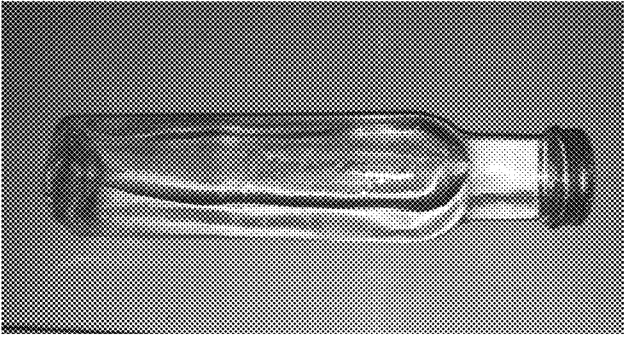

FIG. 3 show the product from homogenously mixing 10 grams of activated carbon into 100 ml of acidified beet juice and letting the mixture rest for an hour produced the best product: clear liquid that tastes like lemonade.

Figure 4:
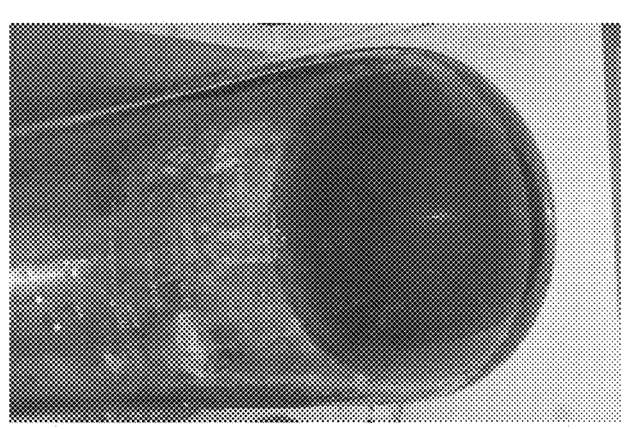

FIG. 4 show the result of processing acidified beet juice where more than 10 grams of activated carbon is combined with 100 ml beet liquid (100 grams of activated carbon in 500 ml of beet juice). The end product was darker, murkier, and overall inferior than that of homogenously mixing 10 grams of activated carbon into 100 ml of non-acidified beet juice and letting the mixture rest for an hour.

Figure 5:
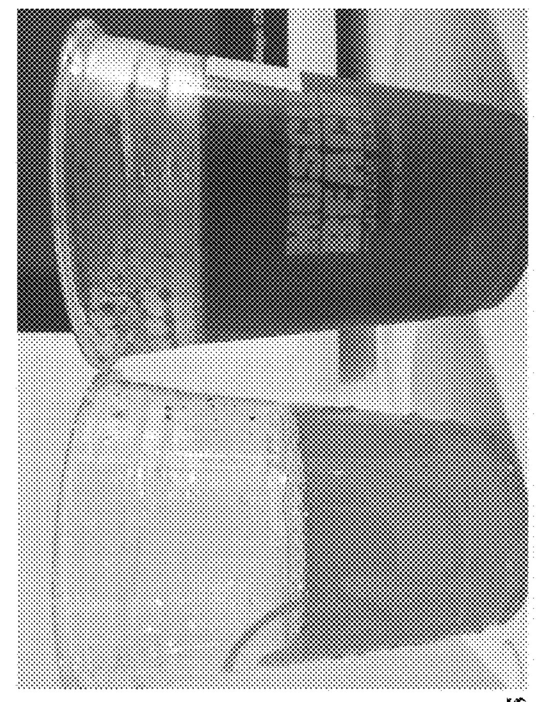
Figure 5:

FIG. 5 shows the beet leaf juice (right) and beet leaf juice processed according to the method described herein (left).

Figure 6A:
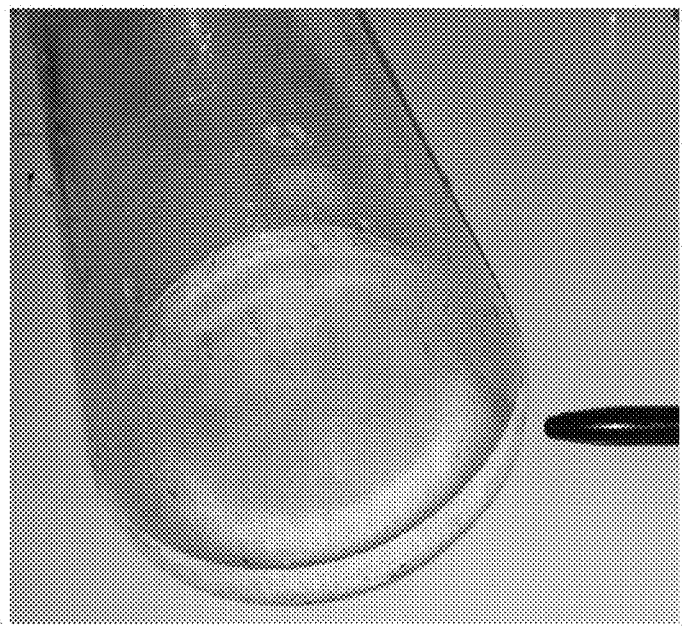
Figure 6B:

FIG. 6A and FIG. 6B depict the processed beet liquid produced from mixing 400 ml of juice from beet leaves (acidified using citric acid to pH of 3.6 from the original pH of 6.07) with 40 grams of activated charcoal. The mixture was stirred for two minutes and left to rest for one hour before the activated charcoal was removed using a funnel filter and qualitative lab filter paper.

Figure 7:

FIG. 7 depicts processed beet liquid from non-acidified (left cup) and acidified (right cup) juice of beet leaves. The beet leaf juice was acidified using citric acid to a pH of 3.6 from the original pH of 6.07).

Figure 8:
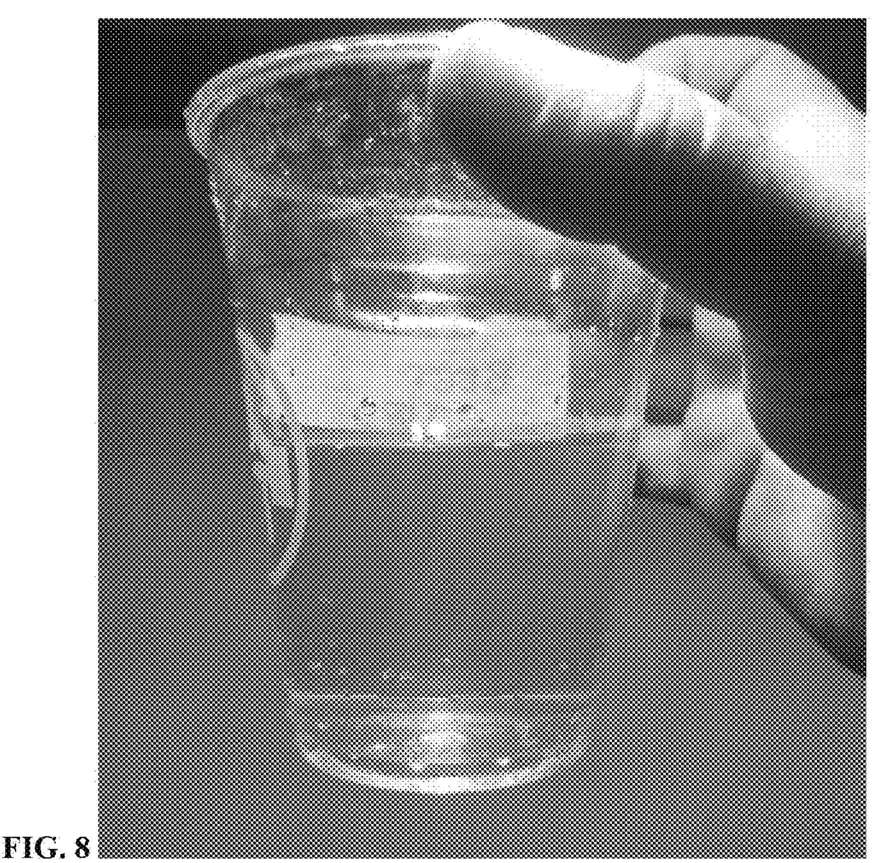

FIG. 8 depicts the processed beet liquid from beetroot juice acidified to a pH of 1.6 using hydrochloric acid (25%). The acidified beetroot juice was mixed with activated charcoal at an amount of 10 grams of activated charcoal per 100 ml of beetroot juice. The combination was actively mixed for two minutes before it is then filtered using a filtration funnel and qualitative lab filter paper to separate the activated charcoal from the processed beet product. The processed beet produce was a lightly dark liquid.

FIG. 9 shows the processed beet product from juice produced from beet leaves and stems acidified to a pH of 3.6 using citric acid. From left to right, the amount of activated charcoal mixed per 100 ml of the beet leaf and stem juice is 1 gram, 3 grams, 5 grams, and 8 grams.

FIG. 10 shows the processed beet product from beetroot juice acidified to a pH of 3.6 using citric acid which was allowed to rest for 12 hours after activated charcoal was homogenously mixed with the beetroot juice (1800 ml beetroot juice and 180 grams of activated charcoal). The longer rest period resulted in improved clarity of the processed beet product.

Figure 11A:
Figure 11B:

FIG. 11A compares the original beetroot juice (right cup) with its corresponding processed beet product (left cup), which is produced by passing the unacidified beetroot juice through an unused Brita® water filter. FIG. 11B compares the processed beet products of non-acidified beetroot juice (right cup, which correspond to the left cup in FIG. 11A) and acidified beetroot juice (left cup) produced by passing the beetroot juice once through an unused Brita® water filter.

Figure 12A:
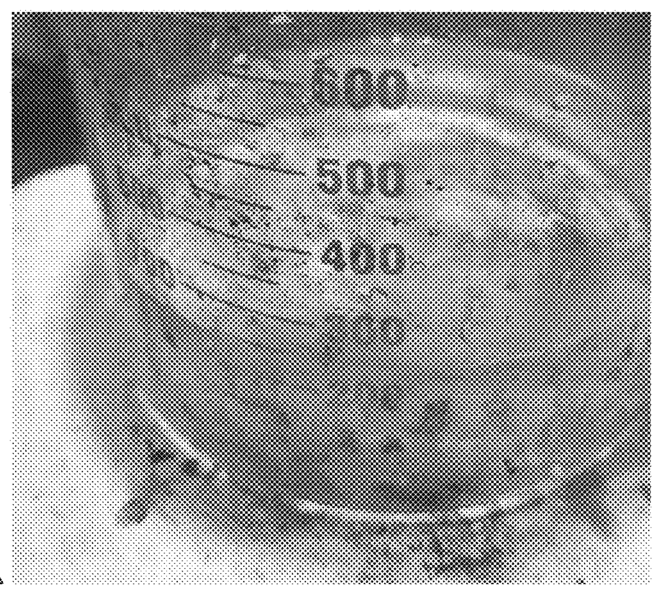
Figure 12B:
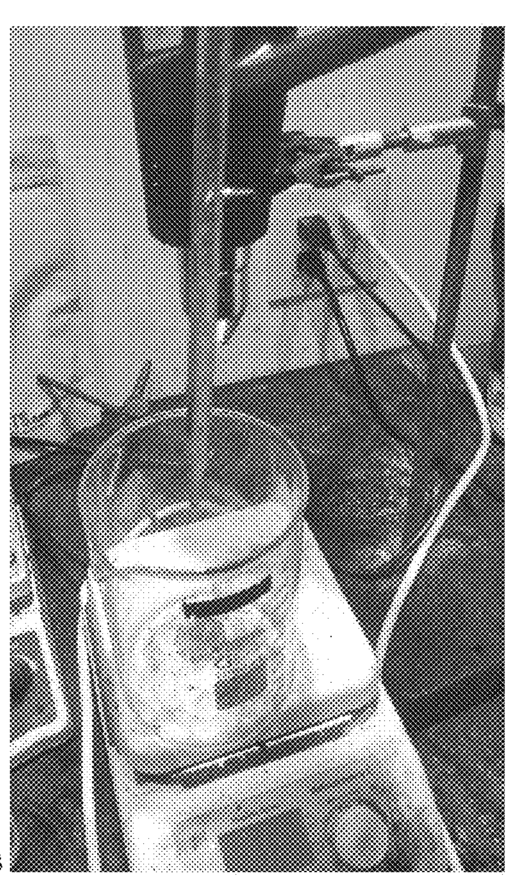

FIG. 12A and FIG. 12B depicts the stages of producing a decolorized beet liquid with an increased level of nitrate content from evaporating the processed beet product produced according to the methods described herein.

Figure 13:
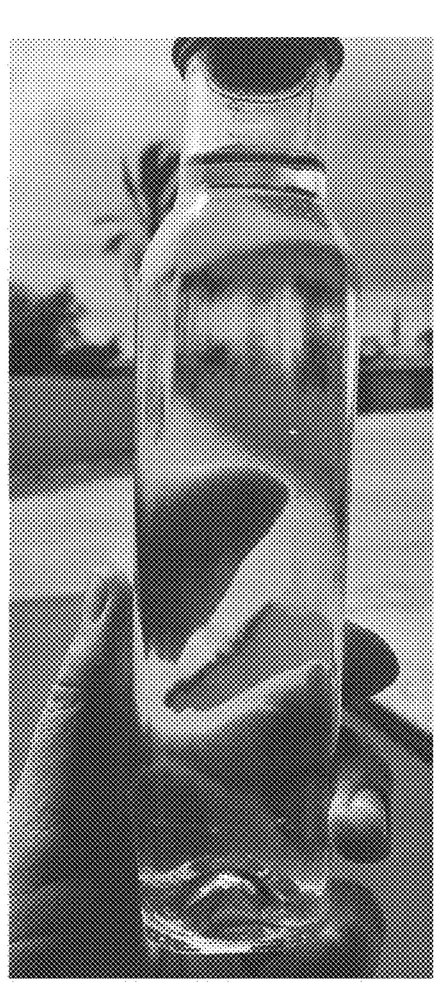

FIG. 13 depicts an exemplary clear and colorless beet juice produced according to the method of Example 12.

Figure 14A:
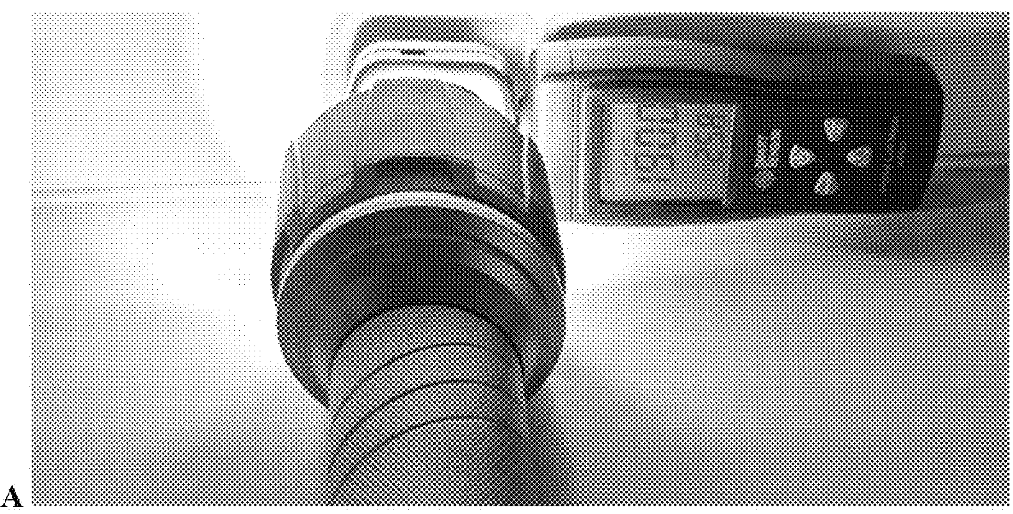
Figure 14B:

FIG. 14A and FIG. 14B shows the measurement of light transparency of the clear and colorless beet juice of FIG. 13. FIG. 14A depicts the conditions for establishing the background reading for the photometer. FIG. 14B depicts the light transparency reading of the clear and colorless beet juice of FIG. 13.

DETAILED DESCRIPTION

As used herein, the verb "comprise" as is used in this description and in the claims and its conjugations are used in its non-limiting sense to mean that items following the word are included, but items not specifically mentioned are not excluded. In addition, reference to an element by the indefinite article "a" or "an" does not exclude the possibility that more than one of the elements are present, unless the context clearly requires that there is one and only one of the elements. The indefinite article "a" or "an" thus usually means "at least one."

As used herein, the term "about" when used in the context of numeric values denotes an interval of accuracy, familiar, and acceptable to a person skilled in the art. Said interval can be +2% of the given value, preferably +5%, and most preferably +10% of the numeric values, where applicable. In some aspects, said interval describes standard deviations of +10%.

As used herein, the term "clear" or "transparent" refers to complete or near-complete optical clarity or light transparency. Thus, the terms describes circumstances where about 100% of light can be transmitted through, for example, wherein at least 90±10%, at least 95±5%, or at least 98±2% of light can be transmitted through.

The present invention relates to methods that safely, easily, and economically remove the red color from products made from the beet plant (*B. vulgaris, Conditiva* group), for example the red color in the leaves or in beetroot juice and its derivatives. As used herein, the term "beet" refers to refers specifically to the *Conditiva* group of *B. vulgaris*. Derivatives of beetroot juice include beetroot liquid extract, beetroot extract powder, beetroot juice powder, beetroot jam, beetroot jelly, and beetroot reduction. As used herein, the term "beet liquid" refers not only to fresh beetroot juice but also to any liquid prepared from beets possessing a red color, for example, canned beetroot juice, beetroot or beet extract, reconstituted beetroot juice powder, dissolved beetroot powder, dissolved beetroot paste, dissolved beet powder made from the whole plant, beet juice made from the whole plant, beet leaves and stems, or only beet leaves, pasteurized beet juice, beet tincture, and the like. In certain implementations, beet liquid refers to juice from non-root portions of beet, such as the stems and leaves. Due to their taste, juice from non-root portions of beet are not preferred, if ever been used, in a juice form in the supplement, nutraceutical, dietary, or pharmaceutical industry. However the applicants have found the juice to be exceptionally high in nitrate (~6 grams nitrate ion per 1000 ml of juice) and could be made palatable and not cause beeturia using the methods described herein.

All of the aforementioned beet products after they have been processed to remove the natural red coloring can be reduced to solid form by evaporation of the water either by heating, by heating in vacuum, or by other suitable or similar methods (e.g. spray drying). Thus the proceed beet liquid can be reduced to a solid beet product, such as decolorized beetroot powder or decolorized beetroot extract. Processed beet liquid may also be reduced by evaporation or by any of the methods specified above to a more viscous state, such as, jam, jelly, or a reduction. Thus, in addition to being directed to methods of removing the red color from beet and methods of preventing beeturia, the invention is also directed to compositions of the processed beet liquid, which has reduced red coloring. While the beet liquid processed according to some implementations of the method described herein would still color clothes, it does not stain clothes as the color can be washed off. An unexpected improvement of the processed beet liquid over its natural counterpart is that the processed beet liquid has better flavor than unprocessed beet juice. In a blind taste test, the decolorized beetroot liquid lacked the distinctive taste of beet. The processed beet liquid produced according to the methods described herein reported to taste like "melon juice" or "lemonade" to testers.

The processed beet juice produced from the above method could be used for a variety of purposes. One such purpose would be for the formulation of energy drinks, where inorganic nitrates and beet juice have a proven beneficial effect, as the process does not significantly alter the amount of nitrate in the beet liquid. The processed beet liquid may be spray dried (or using another suitable drying method) to produce dried beet powder, which can then be used in all solid supplement or pharmaceutical forms. The processed beet liquid may also be concentrated via evaporation to produce a thick liquid containing high concentration of nitrate (higher than 1%, 2%, 3%, 4%, 5%, 6%, 7%, 8%, 9%, 10%, 11%, 12%, or 13%), preferably only from natural nitrate, where no additional source of nitrate is added to the thick liquid, processed beet liquid, or beet liquid. As used herein, the term "nitrate," unless otherwise noted, should only refer to the inorganic nitrate ($NO_3^-$) and not to any other form of nitrate. The inorganic nitrate may be in an amorphous form that naturally exists in the beet plant (as used herein, "natural nitrate"). In some embodiments, the inorganic nitrate may refer to a salt, such as potassium nitrate, sodium nitrate, creatine nitrate and the like where one could use it to fortify a drink or supplement with inorganic nitrate, or as a an ion dissolved in a solution.

The aforementioned products may also be used in compositions or methods where beet and the nutrients contained therein, such as nitrate, vitamin C, and potassium are desirable, while beet's natural color and flavor and the effect of beeturia are objectionable. Exemplary compositions and/or formulation include, but are not limited to juice drinks, "energy" drinks which can contain caffeine, powdered supplement products, sports drinks, nutraceuticals for blood pressure, and the like.

Compositions and/or formulations of the present invention may be administered in any form, including one of a capsule, a cachet, a pill, a tablet, a powder, a granule, a pellet, a bead, a particle, a troche, a lozenge, a pastille, a solution, an elixir, a syrup, a tincture, a suspension, an emulsion, a mouthwash, a spray, a drop, an ointment, a cream, a gel, a paste, a foam, and combinations thereof for example.

Compositions and/or formulations of the present invention may also include an acceptable additive (e.g. one of a solubilizer, an enzyme inhibiting agent, an anticoagulant, an antifoaming agent, an antioxidant, a coloring agent, a coolant, a cryoprotectant, a hydrogen bonding agent, a flavoring agent, a plasticizer, a preservative, a sweetener, a thickener, and combinations thereof) and/or an acceptable carrier (e.g. one of an excipient, a lubricant, a binder, a disintegrator, a diluent, an extender, a solvent, a suspending agent, a dissolution aid, an isotonization agent, a buffering agent, a soothing agent, an amphipathic lipid delivery system, and combinations thereof).

In some embodiments, the compositions of the present invention comprise the processed beet liquid with at least one ingredient that synergizes with the effects of beet products on providing energy and improving health. Such ingredients include, for example, arginine in all its forms, alpha lipoic acid (ALA), adenosine triphosphate (ATP), acetyl-1-carnitine, agmatine, whey protein, antioxidants, polyphenols, apple cider vinegar, arachidonic acid, ashwagandha, *Astragalus, Avena sativa*, branched chain amino acids (BCAAs), Bacopa monniera, vitamins, banaba leaf, beta alanine, betaine, *Boswellia serrata*, bromelain, conjugated linolenic acid (CLA), caffeine, calcium, carbohydrates (such as sucrose or glucose), carnosine, creatine, creatinine, chondroitin, chromium in its various forms, cinnamon extract and its constituents, Cissus *quadrangularis*, citrulline, coenzyme Q10, creatine dipeptides with amino acids (such as creatinyl-1-leucine or aspartic acid, both in the d and l forms), dimethylaminoethanol (DMAE), ecdysterone and various ecdysteroids (such as turkesterone and egg protein), essential amino acids (EAAS), essential fatty acids (EFAS), evodiamine, fish oil, flax seed oil, forskolin, fucoxanthin, gamma-aminobutyric acid (GABA), gamma oryzanol, *Garcinia cambogia*, glycerol, *Gingko biloba*, ginger, glutamine, glucuronolactone, grape seed, green coffee, green tea, guarana, guggulsterones, gymnema sylvestre, hydroxy-isocaproic acid (HICA), hydroxy methyl butyrate (HMB), *Hoodia gordonii*, hordenine, horny goat weed, icariin, huperzin A, hydrolyzed whey protein, inositol, ipriflavone, kola nut, 1-carnitine, 1-cysteine, 1-dopa, 1-glutathione, 1-leucine, 1-lysine, 1-methionine, 1-ornithine, 1-taurine, 1-theanine, 1-tyrosine, lecithin, licorice, longjack, lutein, lycopene, medium chain triglycerides (MCTS), methylsulfonylmethane (MSM), maca, magnesium, manganese, mangosteen, methoxyisoflavone, n-acetylcysteine, niacin, ornithine, omega 3 and 6 oils, pantothenic acid, phenylalanine, phenethylamine, phosphatidyl serine, policosanol, potassium, pregnenolone, pycnogenol, quercetin raspberry ketones, red yeast rice, resveratrol, *Rhodiola rosea*, ribose, rose hips, S-adenosyl-L-methionine (SAMe), selenium, sesamin, shark cartilage, soy protein, spirulina, St. John's wort, stevia, strontium, synephrine, theobromine, Tribulus, turkesterone, turmeric, tyramine, ubiquinol, ursolic acid, vanadium, vitamins (such as, vitamin A, vitamin B, vitamin B12 vitamin B6, vitamin C, vitamin D, vitamin E, and vitamin K), yerba mate, yohimbe, yohimbine, and zinc.

For example, the compositions of the present invention may comprises the processed beet liquid and caffeine. Some composition may further comprise theanine and/or citrulline or a salt thereof.

In certain implementations, the traditional color of beet juice may still be desired. As such, the compositions of the present invention may further comprise a red colorant (for example, beetroot red, pomegranate juice, cranberry juice, regular beet juice), preferably in an amount only sufficient to produce a more natural beet liquid color. Such compositions would not dissuade from the purpose of this invention, as the compositions would still stain less, produce no beeturia, and have better flavor than regular beet juice.

The method of removing the red color from beet liquid comprises combining activated carbon and beet liquid to produce a processed beet product and collecting the processed beet product. Thus the methods may further comprise providing a beet liquid, providing a sufficient amount of activated carbon, and combining the two, for example, by stirring so that the activated carbon is homogenously dispersed in the beet liquid. The sufficient amount of activated carbon is at least 3 grams of activated carbon per 100 ml of beet liquid, for example at least 5 grams of activated carbon per 100 ml beet liquid. In some aspects, the sufficient amount of activated carbon does not exceed 10 grams per 100 ml beet liquid. Accordingly, in certain implementations, the sufficient amount of activated carbon is between 1 and 10 grams per 100 ml of beet liquid, between 3 and 10 grams per 100 ml of beet liquid, between 4 and 10 grams per 100 ml of beet liquid, between 5 and 10 grams per 100 ml of beet liquid, between 1 and 8 grams per 100 ml of beet liquid, between 3 and 8 grams per 100 ml of beet liquid, between 4 and 8 grams per 100 ml of beet liquid, between 5 and 8 grams per 100 ml of beet liquid, 3 grams per 100 ml of beet liquid, 5 grams per 100 ml of beet liquid, 8 grams per 100 ml of beet liquid, or 10 grams per 100 ml of beet liquid.

As used herein, the term "activated carbon" refers to a form of carbon processed to have small, low-volume pores that increase the surface area available for adsorption or chemical reactions. "Activated carbon" can also refer to "active carbon," "activated charcoal," or "active charcoal." As activated carbon has a high degree of microporosity (one gram of activated carbon has a surface area in excess of 3,000 $m^2$ as determined by gas adsorption), in certain implementations, combining the beet liquid and the activated carbon comprises stirring or mixing activated carbon and the beet liquid until the activated carbon is homogenously dispersed in the beet liquid.

While the red color of beet liquid at its regular pH (typically between 5.3 to 6.6) is visibly reduced when the natural beet liquid is combined with activated carbon at an amount of 3 grams per 100 ml beet liquid, a greater amount of the red color is reduced when the beet liquid is acidified. In particular implementations, the beet liquid is acidic prior to being combined with activated carbon, for example, having a pH of less than 6.5, less than 6.0, less than 5.5, less than 5.0, less than 4.5, or less than 4.0. In certain aspects, the pH of the beet liquid is acidified to a pH of between 3.3 and 4.4 or of 3.6. In some implementations where the beet liquid is acidified, the acidified beet liquid is combined with activated carbon (either by mixing or by passing acidified beet liquid through an activated carbon filter) to produce a processed beet product and collecting the processed beet product. In some aspects, the collected processed beet product is combined with activated carbon at least a second time, for example, the collected processed beet product is passed through the activated carbon filter at least a second time.

The agent to acidify the beet liquid may be selected from any solution of acidic pH. For example, the acidifying agent may be selected from the group consisting of: vinegar, acetic acid, citric acid, tartaric acid, malic acid, fumaric acid, lactic acid, lemon juice, lime juice. Mineral acids such as hydrochloric acid, sulfuric acid phosphoric and nitric acid could also be also be used, though these would be considered natural ingredients for food and may cause an objectionable taste. Additionally, nitric acid could be undesirable for people looking to obtain only natural nitrates.

While collecting the processed beet product from the activated carbon filter is simply to collect the filtrate, the step of collecting the processed beet product when the activated carbon and the beet liquid is combined into one mixture includes separating the activated carbon from the processed beet product. In such implementations, the mixture of beet liquid and homogenously distributed activated carbon is rested prior to separating the activated carbon from the processed beet product. Preferably, the beet product combined with the activated carbon is rested for at least 1 minute, for example, at least a ½ hour or about 1 hour, prior to separating the activated carbon from the beet liquid to collect the processed beet product. For example, the acidified beet liquid may be combined with the activated carbon by passing the liquid through an activated carbon filter where the time between when the first drop of beet liquid enters the activated carbon filter and when the first drop of processed beet product exits from the activated carbon filter is at least 1 minute, at least 5 minutes, at least 10 minutes, at least 15 minutes, or at least a half an hour.

In some implementations of the method, processed beet product is evaporated or spray dried for incorporation in a composition or formulation. For example, the processed beet product is concentrated by evaporation using hot air current (100° C.) to produce a thick liquid with increase nitrate content, which significantly increases the nitrate concentration of the beet product to level higher than the most concentrated beet juice drink in the market. This thick liquid could then be further processed to produce liquid capsules or gel capsules that provide nitrate supplementation using a natural source of nitrate. This thick liquid could also be further processed to form a solid composition that provides nitrate supplementation using a natural source of nitrate, for example by mixing the thick liquid with a solid absorbent base (for example, tapioca starch).

EXAMPLES

The disclosure is further illustrated by the following examples that should not be construed as limiting. The contents of all references, patents, and published patent applications cited throughout this application are incorporated herein by reference in their entirety for all purposes.

1. Testing a Water Filter

Figure 1:
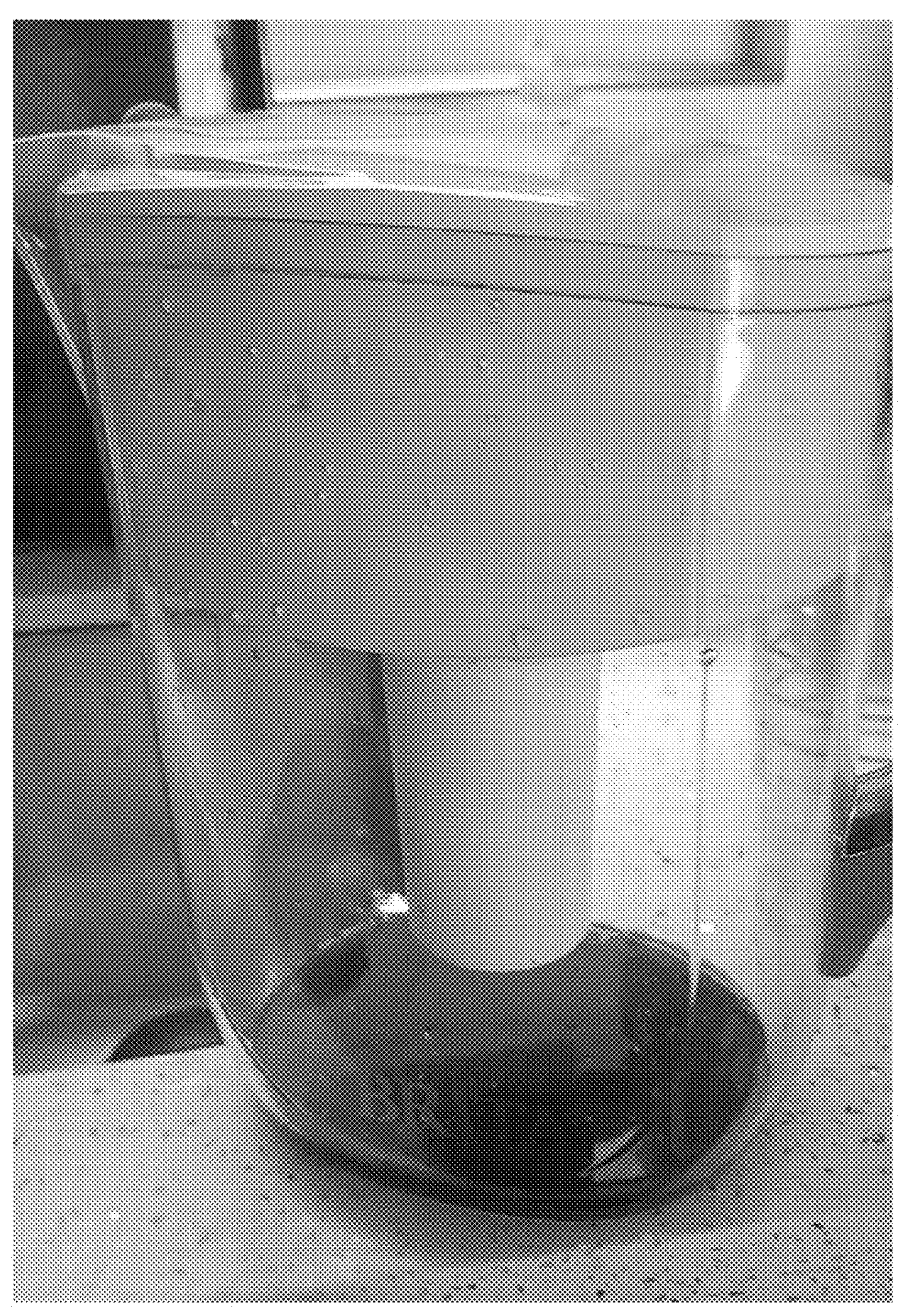
FIG. 1 shows the result of passing beetroot juice through a water filter.

FIG. 1 shows the result of beet juice that is filtered through a commercially available activated carbon water filter. No visible reduction in the red color was seen, and passing the juice multiple times did not produce better results. Passing the juice though a chromatography column filled with activated carbon (60 mm Column O.D.300 mm Length Medium) also failed to produce any noticeable discoloration or improvement of organoleptic characteristics. Thus, a person having ordinary skill in the art would expect that activated carbon is not capable of reducing redness of color. However, it was surprising to discover that the pH of the beet juice and also that dispersing activated carbon by mixing it in the liquid instead of traditionally passing it through an activated carbon filter impacts the effectiveness of activated carbon in removing the red color from beet juice.

2. Testing Amount of Activated Carbon: 1-10 Gram Per 100 ml Beet Liquid

A centrifuge juicer was used to obtain 1000 ml of beetroot juice from commercial beetroot. The pH of the natural juice was 6.2. The natural beetroot juice was split into two 500 ml portions, where one portion was acidified using citric acid to a pH of 3.6 while the other was not treated with citric acid and left at a pH of 6.2. Each 500 ml portion was equally distributed to 5 glass beakers, and to each beaker was added 1, 3, 5, 8 or 10 grams of activated charcoal (thus 1, 3, 5, 8 or 10 grams of activated charcoal per 100 ml beet liquid). The beaker contents were stirred until the activated carbon powder was homogenously distributed throughout the juice. The solution was allowed to rest for 1 hour prior to separating the activated charcoal powder from the beet juice using a filtration funnel. While the red color could be visibly reduced without resting the mixture for one hour, even with a resting period of less than 30 minutes for some mixtures, the reduced resting period resulted in inferior processed beet product. Namely, less of the red color was removed in the process, and more of the natural taste of the unprocessed beet juice remained.

Figure 2A:
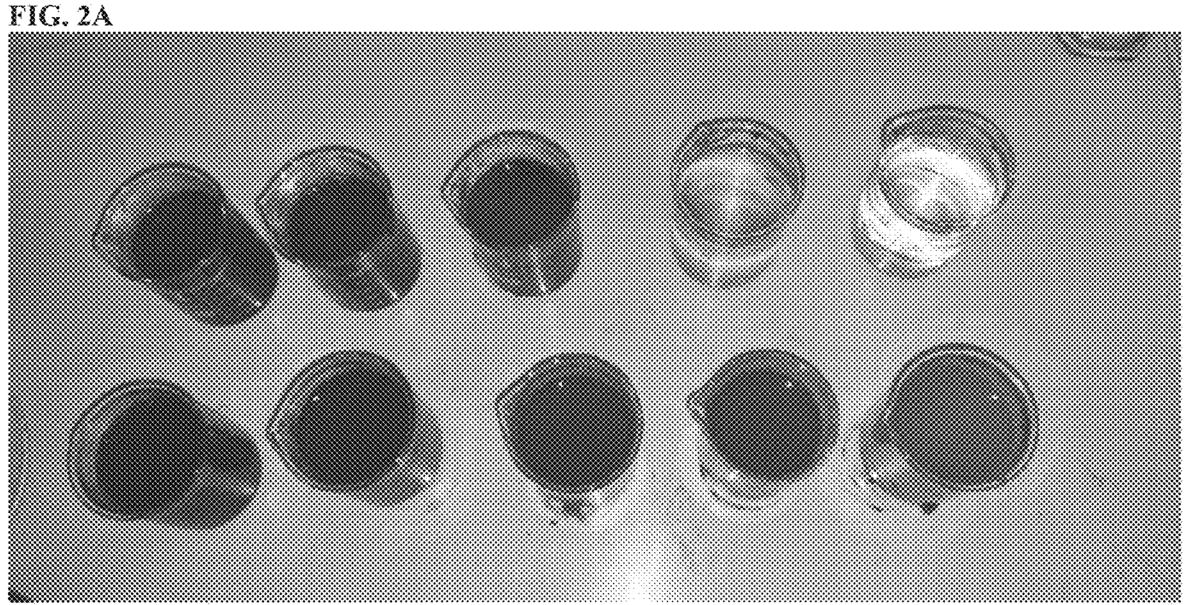
Figure 2B:
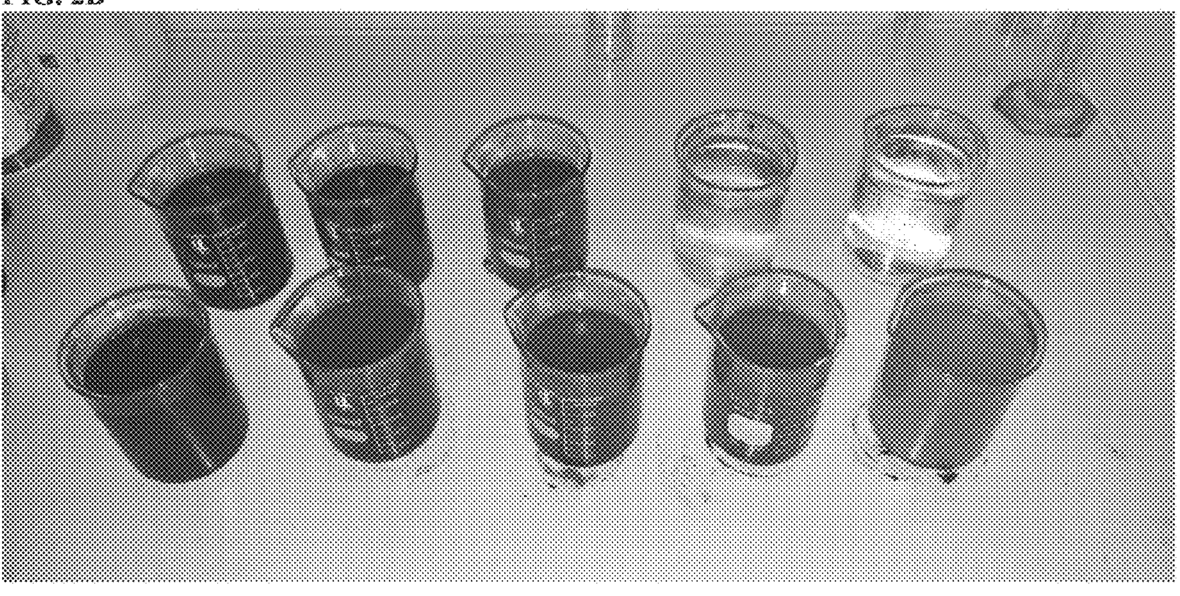
FIG. 2B shows the color of the beetroot juice after processing with various amounts of activated carbon to remove the red color of the beet juice. The process involved combining 100 ml beetroot juice with an amount of activated carbon and stirring the combination until the activated carbon is homogenously dispersed in the beetroot juice. After the combination was rested for an hour prior, the activated carbon was separated (via a funnel filter)

As can be seen in FIG. 2B, beakers containing 1 or 3 grams of activated charcoal powder were insufficient to produce full discoloration, albeit the acidified beet juice was consistently clearer than the non-acidified natural beet juice. In comparison, even for acidified beet juice processed with 1 or 3 grams of activated carbon, the processed acidified beet juice was comparatively less viscous and also tasted better than the processed natural juice.

The best result was achieved by mixing the acidified beet juice with ~10 grams of activated charcoal (FIG. 3). The processed beet product was nearly a totally clear liquid. The flavor was described by blind tasting as that of "lemonade." Spilling this processed beet product on clothes produced no staining. The nitrate content, as measured using a Vernier nitrate ion electrode, did not show any significant difference in nitrate content between the natural beet juice and the processed beet product. Both contained ~1900 mg of nitrate ion per liter of juice.

The non-acidified beet juice mixed with ~10 grams of activated charcoal was also a far superior product, even compared to some of the acidified beet juice that was mixed with lower amounts of activated charcoal. This processed beet product also possessed none of the red color of beet, but the flavor was described by blind tasting as that of "melon juice". The color is a light yellow, comparable to that of many juices. Depending on the flavor requirement of the final product, combining non-acidified beet juice with a sufficient amount of activated carbon may be the preferred method over combining acidified beet with a sufficient amount of activated carbon.

3. Testing Higher Ratios of Activated Carbon to Beet Liquid

Higher ratios of activated carbon to beet liquid did not improve results or require less resting time. A mixture of 500 ml of natural beet juice and 100 g of activated carbon were stirred until the activated carbon was homogenously distributed in the beet juice and then rested for 1 hour. The processed beet product (FIG. 4) was darker and murkier than the processed beet product from combining 10 g of activated carbon with 100 ml of non-acidified beet juice. The processed beet product using more activated carbon did not taste better and was overall an inferior product than the processed beet product resulting from combining 10 g of activated carbon with 100 ml of non-acidified beet juice.

4. Example Formulations

Energy drink formulation:

250 ml processed beet product produced according to the method described herein 250 grams caffeine Pre-workout product:

10 g purified spray dried processed beet product produced according to the method described herein 250 grams caffeine 100 grams theanine 3 g citrulline malate 5. Testing Beet Juice Made from the Leafy Parts of the Beet Plant Juice was obtained from beet greens, and it was also red colored (right cup in FIG. 5). A mixture was created by combining 500 ml of the juice with 50 g of activated charcoal. The mixture was stirred for about 2 minutes to ensure the charcoal was homogenously dispersed in the juice and was left to rest for 30 minutes. After the 30-minute resting period, the processed beet product was collected by filtering the mixture with filtration paper to remove the activated charcoal. The end product was a green liquid (left cup in FIG. 5) that tasted superior to the original liquid. Chromatography detected no red color in the processed beet product. Subjects that ingested the processed beet product did not develop beeturia or associated side effects of ingesting large amounts of beet plant.

6. Testing Acidified Beet Juice Made from the Leafy Parts of the Beet Plant

Juice obtained from beet leaves, original pH of 6.07, was acidified to a pH of 3.6 with citric acid. A mixture was created by combining 400 ml of the juice with 40 g of activated charcoal. The mixture was stirred for about 2 minutes to ensure the charcoal was homogenously dispersed in the juice and was left to rest for one hour. After the resting period, the processed beet product was collected by filtering the mixture with filtration paper to remove the activated charcoal. The end product was a colorless liquid that is nearly indistinguishable from water (FIG. 6A and FIG. 6B). Beet leaf juice that was acidified before mixing with activated charcoal resulted in clearer processed beet juice than if the beet leaf juice was not acidified (FIG. 7). The processed beet juice lacks any flavor apart from the acidity of citric acid. Chromatography detected no red color in the processed beet product. Subjects that ingested the processed beet product did not develop beeturia or associated side effects of ingesting large amounts of beet plant.

7. Testing a Lower pH and the Use of Another Acid for the Acidified Beet Liquid

Beetroot juice (500 ml) was acidified to a pH of 1.6 using hydrochloric acid (25%) before 50 grams of activated carbon was added into the beetroot juice. The combination was mixed for about 2 minutes, until the contents were homogenized. The mixture was then filtered through a filtration funnel using qualitative lab filter paper to remove the activated charcoal. The filtrate was a lightly dark liquid with a slightly gray tint (FIG. 8).

Although a pH of 1.6 is too acidic for human consumption, the pH could be made more neutral with the use of appropriate alkaline substances suitable for human consumption, for example, potassium hydroxide, magnesium hydroxide, sodium bicarbonate and the like.

8. Determining Optimal Amount of Activated Charcoal and pH for Juice Made from Beet Leaf and Juice In four separate flasks containing 100 ml of juice extracted from beet leaves and stems, where the pH of the beet juice was acidified to 3.6 from 6.1 using citric acid, activated charcoal in amounts of 1, 3, 5, and 8 grams were added. The mixture was stirred until the activated charcoal is homogenously dispersed in the beet juice and left to rest for 1 hour. The activated charcoal was separated from the processed beet product using a filtration funnel and qualitative lab filter paper. At 1 gram, activated charcoal was not sufficient to produce a clear product even after acidification (FIG. 9). When 3 grams and more of activated charcoal was added, the processed beet product was consistently clear and better tasting. The best results were produced when at least 8 grams of activated charcoal was added to 100 ml juice extracted from beet leaves and stems.

9. Increasing the Resting Period

Beetroot juice (1800 ml) was acidified to pH of 3.6 using citric acid before 180 grams of activated charcoal were added to the acidified juice. The mixture was stirred for about three mixture to ensure the activated charcoal was evenly dispersed in the juice, and the mixture was left to rest overnight (about 12 hours) before the activated charcoal was separated through filtration with qualitative filter paper. The liquid obtained was a clear, colorless liquid, devoid of all the unpleasant flavor of beet juice and with a flavor similar to that of lemonade (FIG. 10). Thus leaving the acidified juice for extended periods of time (over 1 hour) to steep in the active carbon produces superior results in the clarity of the liquid.

10. Testing Effect of Acidification on the Filtering of Beet Juice Via a Regular Active Carbon Filter Juice from beet greens (200 ml, pH of 6.8) was passed through an unused commercial Brita®. As observed in Example 1, filtering the beet liquid through the Brita® filter did not any observable change in the color or the flavor of the beet liquid (FIG. 11A). However, when 200 ml of the same batch of beet green juice was acidified to a pH of 3.6 using citric acid before being passed through an unused Brita® filter, the filtered beet liquid had reduced redness compared to original beetroot juice as well as its filtrate (FIG. 11B). The flavor also improved. Thus, the redness of the beet liquid can be better reduced and the flavor better improved if the pH of the beet liquid is lowered prior to combining the beet liquid with activated carbon (whether the activated carbon is homogenously mixed into the beet liquid or passing the beet liquid through an activated carbon filter).

11. Producing a High Nitrate Content Beet Liquid

Purified beet product from acidified beet leaf juice was evaporated using a hot air current (about 100° C.). The starting volume of 250 ml (FIG. 12A) decolorized beet leaf juice was reduced to 4 ml (FIG. 12B), and the final evaporated processed beet product was a thick liquid. One milliliter (1 ml) of the thick liquid was dissolved in 100 ml of water, and the nitrate content of the solution was determined using a Vernier nitrate electrode. The nitrate content of the thick liquid was found to be 13%, which is exceptionally higher than any liquid or solid form of beetroot or whole beet plant currently on the market. Beetroot powder typically contains 1-2% of nitrate, and beetroot juice from 0.05-0.57% nitrate (exemplified by the beet juice drink currently on the market with the highest concentration of natural nitrate, BEET IT Sport Nitrate 400). Thus the liquid produced by the method contains nitrate in an amount over 20 times higher than the most concentrated beet juice drink currently in the market. The thick liquid produced could be used to make various products for supplementation with natural nitrates, such as made into liquid capsules or gel capsules, or added to various supplement formulations or compositions, such as drinks, to fortify them with natural nitrate.

12. Producing a Clear Beet Liquid

Optical clarity, also known as light transparency, is an important aspect in the juice industry. Clear (or transparent) liquids do not stain clothes or other surfaces. For example, the clear beet juice described herein does not cause beeturia in any of the subjects to whom the beet juice was administered. Other descriptions used in the industry to described a transparent liquid include, but are not limited to, see-through, fine, thin, sheer, flimsy, translucent, gossamer, diaphanous, gauzy, filmy.

An emerging great advantage of producing clear juices is the ability to use UV sterilization, which uses UV radiation to kill harmful and spoilage bacteria and fungi, instead of heat-based pasteurization methods. In the United States, the Food and Drug Administration allows UV radiation for the processing and treatment of food and food products, portable water, and juice products (see 21 C.F.R. 179.39). In Canada, this method of sterilization is considered a novel and only accepted for shelf-life extension of apple cider. In Europe, UV sterilization has only been approved for milk pasteurization. On the other hand, New Zealand and Australia deems UV radiation to be an equivalent method to thermal treatments, such as pasteurization. Thus, UV sterilization is an emerging technology in the global juice manufacturing and processing industries.

Compared to pasteurization, UV sterilization requires less energy, making it more eco-friendly and having less of an environmental impact. UV sterilization produces less heat is no heat, which reduces both the environmental and financial costs of juice production. UV radiation also does not require materials like temperature-resistant plastics. Importantly, UV radiation destroys much less nutrients (such as vitamins, carotenoids, flavonoids and antioxidants) that heating methods such as pasteurization destroy, resulting in products with much improved nutritional value compared to conventionally pasteurized juices.

UV sterilization is most successful at killing bacteria and fungi in a liquid when the liquid is clear-having at or around 100% light transparency. A material has 100% light transparency when no light is absorbed by the material when it passes through, thus enabling 100% of the light to pass through. Such materials include distilled water, atmospheric clean air and clear transparent glass. Because dark liquids do not allow light to pass through, UV radiation or any electromagnetic radiation in the light spectrum would not pass through. If the sterilizing radiation does not penetrate the liquid, then the liquid is not disinfected.

To the applicants knowledge, clear juice has been produced. The decolorized beet juice described herein are the first reports of a clear juice produced from highly pigmented source material. The process described below has been optimized to produce a decolorized beet product with the same optical clarity as distilled water.

Citric acid was added to the beet juice in a glass beaker until the contents of the beaker reached a pH of 3.6. Then, activated carbon (50 g for 500 ml beet juice) was added to the contents of the beaker. The beaker was stirred with a magnetic bar (10 mm length Teflon® magnetic bar for 500 ml beet juice) at 300 rpm for one hour. Longer stirring times or higher speeds could result in breakdown of the active carbon in nanoparticles, which produces an inferior product. On the other hand, lower speeds and shorter times do not produce a clear product. After the beet juice mixture was stirred for one hour, the beaker was left in an airtight chamber for 12 hours at ambient temperature or at 25° C. The liquid was then filtered through with a filter paper (101 Qualitative Filter Paper) and then stored in clear glass bottles.

The liquid obtained did not differ optically from a similar bottle containing distilled water. A Lux light meter photometer was used to measure the optical transparency of the decolorized beet juice. The photometer was set on a bench on white background at ambient room temperature. A Husky 1000 lumen flashlight provided an additional light source to the ambient lighting, and the photometer registered a light intensity of 1900 lumen. The clear glass bottle was put in front of the photometer. The photometer registered a light intensity of 1901 lumen (the 1 lumen more can be attributed to standard deviation). Thus, the photometer measure showed the clear beet juice produced has the same optical clarity and light transparency as distilled water, clean air, and transparent glass. As such, the clear beet juice would be an ideal candidate for UV sterilization.

We claim:

1. A purified beet juice composition comprising a beetroot liquid produced from a *Beta vulgaris, Conditiva* group, plant, wherein:

red color of the beetroot liquid has been removed;

the beet juice composition has a nitrate content of more than 1% nitrate as nitrate ion; and the beet juice composition has at least 90% light transparency.

2. The composition of claim 1, wherein the nitrate content consists of nitrate found naturally in beets.

3. The composition of claim 1, further comprising at least one compound selected from the group comprising: caffeine, citrulline or a salt thereof, and theanine.

4. The composition of claim 1, wherein the composition is a clear liquid.

5. The composition of claim 4, wherein the beet juice composition has at least 95% light transparency.

6. The composition of claim 4, wherein the beet juice composition has at least 98% light transparency.

7. The composition of claim 4, wherein the beet juice composition has 100% light transparency.

8. The composition of claim 1, further comprising a food additive.

9. The composition of claim 8, wherein the food additive is a food colorant other than betanin.

10. The composition of claim 1, wherein the composition is produced according to the method comprising:

providing beetroot liquid from a *Beta vulgaris, Conditiva* group, plant;

acidifying the beetroot liquid to a pH of 3.6 to produce acidified beet juice;

combining activated carbon with the acidified beet juice at a ratio at least 8 g activated carbon for each 100 ml beetroot liquid;

resting the combination of activated carbon and acidified beet juice for at least one hour to produce a processed beet product;

filtering out the activated carbon from the processed beet product; and collecting the processed beet product.

11. The composition of claim 10, wherein 10 g activated carbon is combined with each 100 ml beetroot liquid.

12. The composition of claim 10, wherein combining activated carbon with the acidified beet juice further comprises stirring a mixture of acidified beet juice and activated carbon for one hour.

13. The composition of claim 12, wherein the mixture of acidified beet juice and activated carbon is stirred with a magnetic rod at 300 rpm.

14. The composition of claim 12, wherein the combination of activated carbon and acidified beet juice is rested for 12 hours after it is stirred to produce the processed beet product.

15. The composition of claim 14, wherein the combination of activated carbon and acidified beet juice is rested at 25° C.

16. The composition of claim 10, further comprising evaporating the processed beet product to produce a thick beet liquid.

17. The composition of claim 10, further comprising a food additive.

18. The composition of claim 17, wherein the food additive is a food colorant other than betanin.

* * * * *